United States Patent [19]
Thomas, Jr.

[11] 3,882,573
[45] May 13, 1975

[54] FLEXIBLE, REUSABLE FASTENER

[76] Inventor: Stanley E. Thomas, Jr., 74 Orchard Ave., Weston, Mass. 02193

[22] Filed: Jan. 2, 1974

[21] Appl. No.: 429,515

[52] U.S. Cl............................ 24/30.5 T; 24/255 BC
[51] Int. Cl............................................. B65d 77/10
[58] Field of Search..... 24/30.5 R, 30.5 T, DIG. 28, 24/256, 255 R, 255 SL, 255 BC, 261 PT, 261 C, 30.5 P

[56] References Cited
UNITED STATES PATENTS
3,535,746  10/1970  Thomas........................... 24/30.5 T
3,604,066  9/1971  Moon................................. 24/256

FOREIGN PATENTS OR APPLICATIONS
571,439  3/1959  Canada........................... 24/30.5 T
6,702,594  2/1967  Netherlands..................... 24/255 R Primary Examiner—Paul R. Gilliam
Assistant Examiner—Kenneth J. Dorner
Attorney, Agent, or Firm—Richard J. Birch

[57]  ABSTRACT

A substantially planar, omega-shaped flexible fastener having a resilient spring-like, loop-shaped body portion with integrally formed end portions that terminate in oppositely facing hook-like segments. Each hook-like segment has at least one notch formed therein which mechanically cooperates with the notch formed in the other hook-like segment when the segments are intertwined and stress is applied to the loop-shaped body portion by outwardly acting forces.

4 Claims, 4 Drawing Figures

PATENTED MAY 13 1975　　　　　　　　　　　3,882,573

3,882,573

FLEXIBLE, REUSABLE FASTENER

BACKGROUND OF THE INVENTION

The present invention relates to flexible fasteners in general and, more particularly, to a flexible, reusable fastener having a mechanical interlock.

The field of fasteners for fastening together bundles of wires or flexible bags such as the ubiquitous plastic bread bag is relatively well developed. Representative examples of such fasteners are found in the following U.S. Letters Pat. Nos: 3,571,861; 3,259,302; 3,348,595; 3,170,213; 3,426,393; 571,439; 3,275,695; 2,654,624; 3,604,066; 3,088,702; 3,164,250; 3,535,746; 3,543,353.

The Thomas and Meehan patents, U.S. Pat. Nos. 3,535,746 and 3,543,353, each disclose a substantially planar, omega-shaped flexible fastener having a resilient spring-like, loop-shaped body portion with integrally formed end portions that terminate in oppositely facing hook-like segments. When the hook-like segments of the Thomas and Meehan fasteners are intertwined, as shown in FIG. 4 in each of the patents, the hook-like segments contact each other at two separate points on each segment. If the Thomas and Meehan type fasteners are applied to a flexible bag, the two fasteners will remain in the intertwined, fastened condition only if no outwardly acting stress is imposed upon the loop-shaped body portion of the respective fasteners. An outwardly acting stress is generated if the flexible bag is heavily loaded. Experimentation has shown that under such load conditions, the flexible plastic bag tends to work its way through the contact point between the hook-like segments nearest to the loop-shaped body portion and force the segments apart by means of a "camming" action. If the load in the flexible bag is sufficient, the bag will force apart the intertwined hook-shaped segments of both the Meehan and Thomas type fasteners. Although these types of fasteners are perfectly suitable for certain applications, such as, a bread bag in which the weight of the bag's material is relatively light, they are unsatisfactory for use with the heavy loads normally encountered in the common 20–30 gallon plastic trash bag. Such bags are known in the trade as a 16 × 14 × 37 bag.

It is accordingly a general object of the present invention to provide an improved reusable bag fastener.

It is a specific object of the present invention to provide a reusable bag fastener which will not open under load.

It is still another object of the present invention to provide a reusable bag fastener which has a mechanical interlock in the operative position.

It is a feature of the present invention that the mechanical interlock can be actuated by hand or automatically when the flexible fastener is stressed by a bag load.

It is another feature of the invention that the flexible fastener can be fabricated from a variety of materials under production line conditions.

BRIEF SUMMARY OF THE INVENTION

The flexible, reusable bag fastener of the present invention is a substantially planar, omega-shaped fastener having a resilient spring-like, loop-shaped body portion with integrally formed end portions which terminate in oppositely facing hook-like segments. Each hook-like segment has at least one notch formed therein which mechanically cooperates with the notch formed in the other hook-like segment when the segments are intertwined and stress is applied to the loop-shaped body portion by outwardly acting forces. In the preferred embodiment of the invention, the planar hook-like segments are normal to each other in the interlocked position.

The objects and features of the present invention will best be understood from a detailed description of a preferred embodiment thereof, selected for purposes of illustration and shown in the accompanying drawings, in which.

Figure 1:
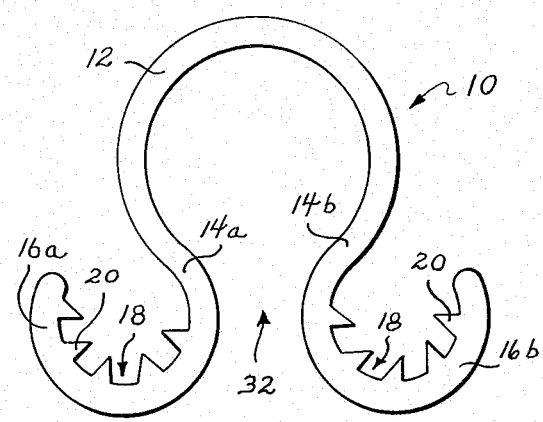
FIG. 1 is a plan view of the improved flexible bag fastener of the present invention.
Figure 2:
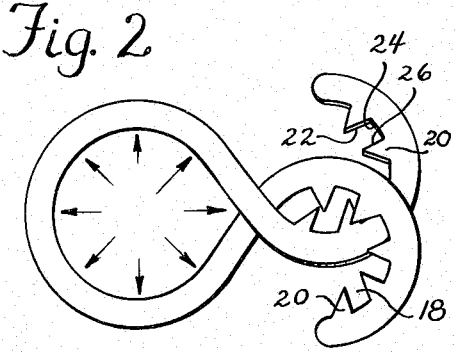
FIG. 2 is a prospective view showing the fastener of FIG. 1 with the hook-like segment of the fastener partially intertwined.

Turning now to the drawings, there is shown an improved flexible, reusable bag fastener constructed in accordance with the present invention and indicated generally by the reference numeral 10. The fastener 10 is substantially planar and has an omega-shaped configuration as best seen in FIG. 1. The component portions and segments of the fastener 10 are identified in FIG. 1 and comprise the following: a resilient spring-like loop-shaped body portion 12 with integrally formed end portions 14a and 14b which terminate in corresponding oppositely facing hook-like segments 16a and 16b. Each hook-like segment 16 has at least one notch 18 formed therein which mechanically cooperates with the notch formed in the other hook-like segment when the segments 16a and 16b are intertwined and stress is applied to the loop-shaped body portion by outwardly acting forces as shown in the FIGS. 2 and 3.

Figure 3:
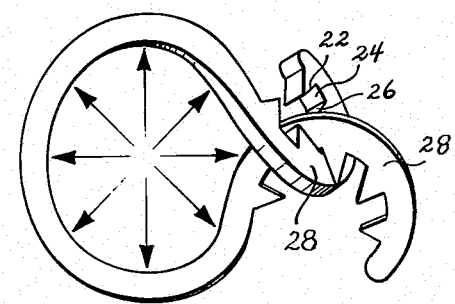
FIG. 3 is another prospective view similar to that shown in FIG. 2 but with the hook-like segment depicted in the fully intertwined, interlocked position.
Figure 4:
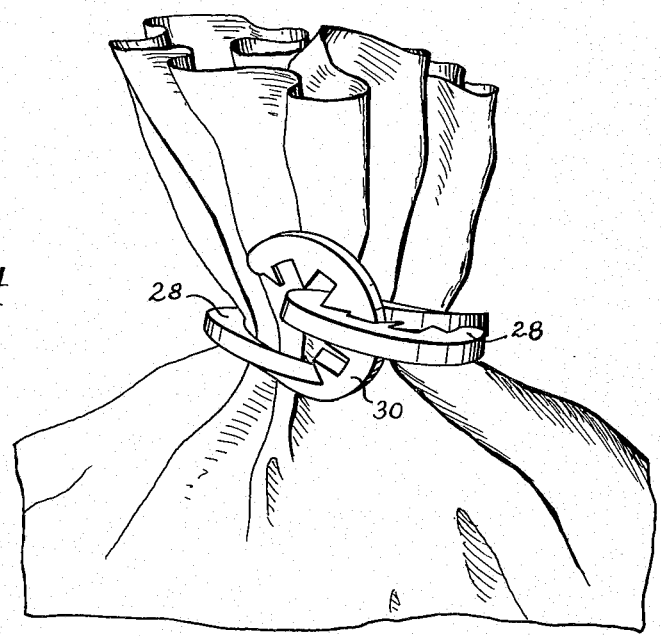
FIG. 4 is still another prospective view showing the fastener of FIG. 1 applied to a flexible bag with a hook-like segment fully interlocked.

In the preferred embodiment of the present invention, a plurality of notches 18 are formed in each of the hook-like segments 16a and 16b by means of a plurality of counter pitched teeth 20. Looking at FIGS. 2 and 3, the teeth 20 form the notches 18 by means of three surfaces: a hook-end surface 22, a valley surface 24 and an inside end surface 26. In addition, the substantially planar fastener has a planar front or first surface 28 and a planar back or second surface 30 as shown in FIGS. 3 and 4. Since the fastener 10 is resilient, each one of the hook-like segments 16a and 16b is urged toward the outer end of the other hook-like segment when the segments are interlocked as shown in FIGS. 3 and 4. Thus, in the interlocked position, the valley surface 24 of one segment notch is in contact with the valley surface 24 of the other segment notch. Similarly, the front surface 28 is in contact with the hook end surface 22 of one segment while the back surface 30 is in contact with the hook end surface 22 of the other segment. In this configuration, the intertwined hook-like segments are securely interlocked together at a single contact point in contrast to the previously mentioned Thomas and Meehan fasteners.

Testing of the fastener 10 of the present invention has demonstrated that the fastener will remain in the interlocked position as shown in FIG. 4 of the drawings under both normal and severe usage conditions. The fastener 10 was applied to a 20-gallon plastic trash bag which was filled with approximately 20 pounds of wood bark chips. The loaded bag was first tested by resting the bag on a floor and then jerking the bag upwardly by grasping the bag at the neck of the bag above the interlocked fastener. The fastener remained interlocked after performing this test. A second test was performed by grasping the loaded bag by the neck portion of the bag above the interlocked fastener and then hurling the loaded bag against a cinder-block wall. The results of this test showed that the fastener remained locked even though the bag itself at times ruptured.

It will be appreciated by those skilled in the art that the flexible resilient fastener of the present invention can be made from a variety of materials utilizing well-known plastic working techniques. Preferably, the fastener is formed from a resilient thermo-plastic material which is extruded through a die having the omega configuration shown in FIG. 1 and then cut into the thin, substantially planar shape. Other material working techniques, such as, stamping, injection molding or die cutting from sheet stock can be employed to produce the fastener. Polypropylene and polyethylene are suitable materials for fabricating the flexible resilient fastener of the present invention.

Having described in detail a preferred embodiment of my invention, it will now be apparent to those skilled in the art that numerous modifications can be made therein without departing from the scope of the invention as defined in the apended claims. What I claim and desire to secure by Letters Patent of the United States is:

1. A flexible substantially planar, omega-shaped fastener comprising a resilient, spring-like, loop-shaped body portion having planar front and back surfaces and integrally formed end portions which each terminate in oppositely facing hook-like segments, said hook-like segments each having a concave portion in which at least one inwardly extending notch is formed with each of said notches having a hook-end surface and a valley surface so that when said hook-like segments are intertwined in an interlocked position, the valley surface of the notch in one hook-like segment contacts the valley surface of the notch in the other hook-like segment and the hook-end surface of the notch in said one hook-like segment contacts the front surface of said other hook-like segment while the hook-end surface of the notch in said other hook-like segment contacts the back surface of said one hook-like segment.

2. The fastener of claim 1 further characterized by a plurality of notches formed in the concave portion of each hook-like member.

3. The fastener of claim 2 wherein said pluralities of notches are defined by corresponding pluralities of counter-pitched teeth formed in the concave portions of said hook-like segments.

4. The fastener of claim 1 wherein said hook-like segments are in planes which are substantially normal to each other when said segments are intertwined in an interlocked position.

* * * * *